(12) United States Patent
Fong et al.

(10) Patent No.: US 11,869,308 B2
(45) Date of Patent: *Jan. 9, 2024

(54) CASINO CAGE CASHOUT SYSTEM WITH INTEGRATED CHIP VALIDATION AND TRANSACTION RECORD GENERATION

(71) Applicant: Everi Payments Inc., Austin, TX (US)

(72) Inventors: Adam Fong, Las Vegas, NV (US); Suresh Narayanan, Las Vegas, NV (US); Marcie Arai, Las Vegas, NV (US)

(73) Assignee: Everi Payments Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/971,571

(22) Filed: Oct. 22, 2022

(65) Prior Publication Data

US 2023/0042875 A1 Feb. 9, 2023

Related U.S. Application Data

(63) Continuation of application No. 16/586,296, filed on Sep. 27, 2019, now Pat. No. 11,488,445.

(60) Provisional application No. 62/741,751, filed on Oct. 5, 2018.

(51) Int. Cl.
*G07F 17/32* (2006.01)
*G06Q 20/20* (2012.01)

(52) U.S. Cl.
CPC ....... *G07F 17/3246* (2013.01); *G06Q 20/204* (2013.01); *G07F 17/3234* (2013.01); *G07F 17/3241* (2013.01); *G07F 17/3248* (2013.01); *G07F 17/3239* (2013.01)

(58) Field of Classification Search
CPC ............. G07F 17/3246; G07F 17/3234; G07F 17/3241; G07F 17/3248; G07F 17/3239; G07F 19/201; G07F 19/205; G07F 19/207; G06Q 20/204; G06Q 20/1085
See application file for complete search history.

(56) References Cited

U.S. PATENT DOCUMENTS

| | | | |
|---|---|---|---|
| 2010/0160032 A1 | 6/2010 | Paton | |
| 2010/0203961 A1 | 8/2010 | Burke | |
| 2014/0074694 A1* | 3/2014 | Mateen | ........... G06Q 20/04 235/379 |
| 2016/0284160 A1 | 9/2016 | Oh | |
| 2017/0169668 A1 | 6/2017 | LaDuca | |

(Continued)

FOREIGN PATENT DOCUMENTS

WO WO-2019194673 10/2019

*Primary Examiner* — A. Hunter Wilder
(74) *Attorney, Agent, or Firm* — Weide & Miller, Ltd.

(57) ABSTRACT

A casino cage cashout system includes integrated chip validation and transaction record generation. The system includes an interface to a chip reader. An output of the chip reader is used to generate chip information, including chip value, such as for causing an automated cash dispenser to dispense cash in an amount equal to the value of the chips being redeemed. The cage cashout system is also integrated with an anti-money laundering (AML) system, wherein the cage cashout system automatically generates a transaction report which include information regarding the chip cashout and transmits that report to the AML system.

17 Claims, 7 Drawing Sheets

(56) References Cited

U.S. PATENT DOCUMENTS

2020/0320820 A1    10/2020  Bros
2021/0264728 A1*   8/2021   Shigeta .................. G07D 11/34

* cited by examiner

| Kiosk status: | CAGE APP MENU | Logged employee: |
| --- | --- | --- |
| Ready | | 9 |

| | Items entered | Amount |
| --- | --- | --- |
| Vouchers | Chips | $0.00 |
| Chips Turn-in | Vouchers | $0.00 |
| Bill Break | Bills | $0.00 |
| Personal Check | Personal Check | $0.00 |
| Short Pay | Manual Entry | $0.00 |
| Manual Entry | TOTAL: | |
| Dashboard | Player card: | |

FIG. 3

Kiosk status: Ready                                      Logged employee: 9

CHIPS

| ◉ $0.25 | [-] [0] [+] |  | ◉ $0.50 | [-] [0] [+] |
| ◉ $1.00 | [-] [0] [+] |  | ◉ $5.00 | [-] [0] [+] |
| ◉ $25.00 | [-] [0] [+] |  | ◉ $100.00 | [-] [0] [+] |
| ◉ $500.00 | [-] [0] [+] |  | ◉ $1,000.00 | [-] [0] [+] |

TOTAL CHIP COUNT: 0
TOTAL: $0.00

[((o)) Run RFID Count & Auth]

[Return to Menu]　　[Clear]　　[Confirm Count]

FIG. 6

CASINO CAGE CASHOUT SYSTEM WITH INTEGRATED CHIP VALIDATION AND TRANSACTION RECORD GENERATION

RELATED APPLICATION DATA

This application is a continuation of U.S. application Ser. No. 16/586,296, filed Sep. 27, 2019, which claims priority to U.S. Provisional Application Ser. No. 62/741,751, filed Oct. 5, 2018, which prior applications are each incorporated by reference in its entirety herein.

FIELD OF THE INVENTION

The present invention relates to methods of cashing out casino chips.

BACKGROUND OF THE INVENTION

Casinos generally operate one or more casino "cages." These cages are cashier stations at which various financial transactions may be performed, generally with the aid of a cashier. As one example, a player who has winnings from the play of a table game may desire to cash in their chips. The player may take the chips to the cashier at the casino cage in order to trade those chips for monetary funds.

Generally, the cashier will manually count the chips and then exchange those chips for currency in the amount of the chips. A problem with this process is that it can be very slow, depending upon the number of chips that need to be counted. This can cause lines to form at the cashier station, making players unhappy. An even bigger problem is that the cashier may make errors when attempting to count the chips manually.

Yet another problem with the existing cashier station activities is that many of them are associated with regulated activities. For example, depending upon the size of the transaction, the casino may be required to report the transaction. At the end of the day, the casino may review all cage transactions to determine those which meet reporting requirements and then create reports for those transactions.

An improved casino cage cashout system which addresses these and other issues is desired.

SUMMARY OF THE INVENTION

Embodiments of the invention comprise a casino monetary system, such as a casino cage cashout system which includes integrated chip validation and transaction record generation.

In one embodiment, the system comprises a casino cage workstation, a cash server, and a monetary value cash dispenser (such as a secure dispenser). The system includes an interface to a chip reader. The chip reader may be located at the casino cage and is configured to detect one or more casino chips which are presented by a player for cashout. The reader may include at least one chip detector and a controller which is configured to generate an output regarding the detected chips.

An output of the chip reader is used to generate chip information, including chip value. Information regarding the detected chips may be presented to the cashier at the cashier workstation for validation (including, where applicable, modification of the numbers of chips or denominations thereof by the cashier from the numbers and amounts detected by the chip reader). The system is configured to cause the cash dispenser to dispense cash in an amount equal to the value of the chips being redeemed.

In a preferred embodiment, the cage cashout system is also integrated with an anti-money laundering (AML) system, wherein the cage cashout system automatically generates a transaction report which include information regarding the chip cashout and transmits that report to the AML system.

In one embodiment, the chip reader interface is configured to integrate with chip readers from different vendors which may provide outputs based upon different protocols.

Further objects, features, and advantages of the present invention over the prior art will become apparent from the detailed description of the drawings which follows, when considered with the attached figures.

DESCRIPTION OF THE DRAWINGS

FIGS. 3-7 illustrate graphic displays of a system of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise a casino cage cashout system with integrated chip validation and transaction record generation.

Figure 1:
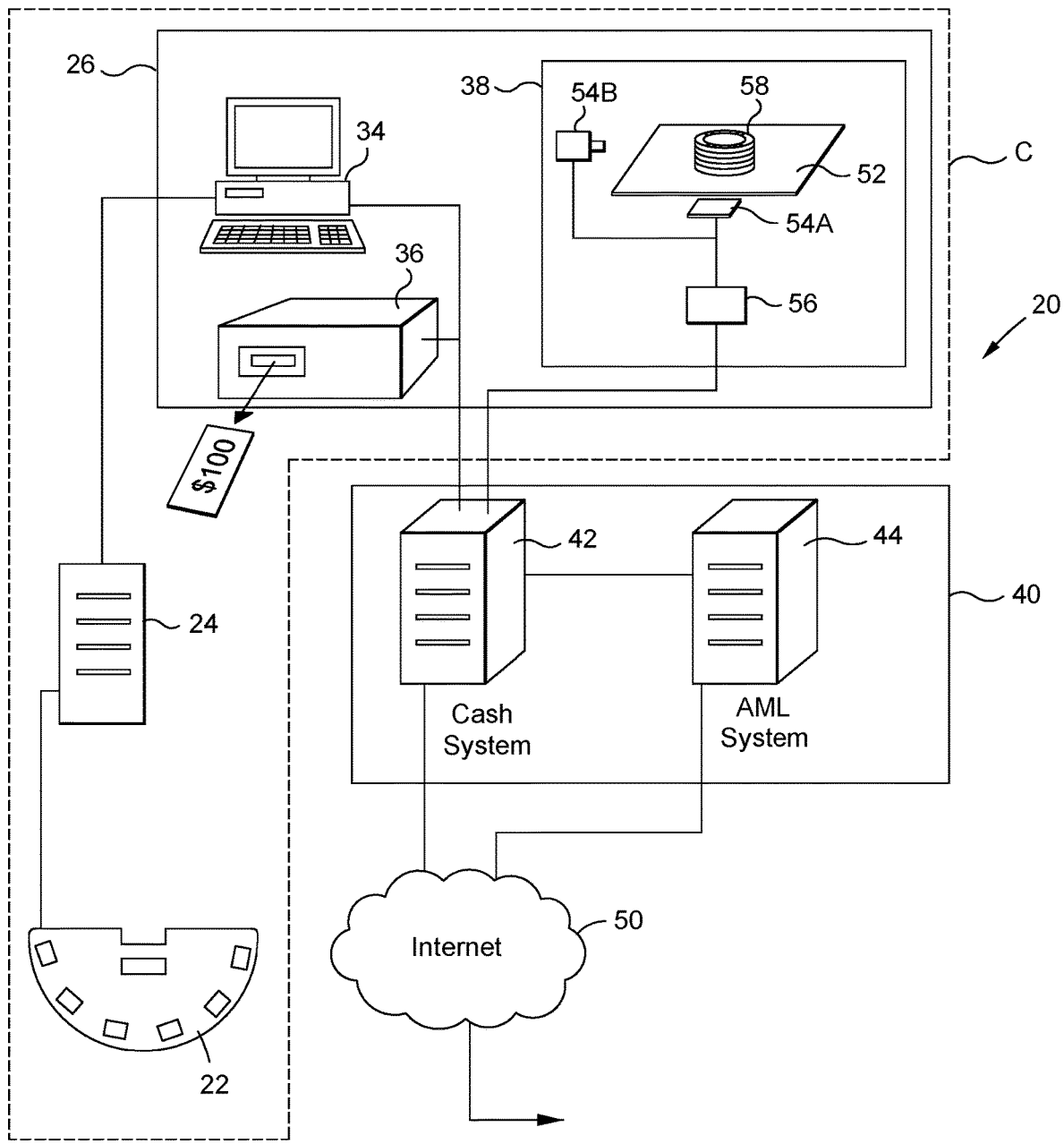
FIG. 1 illustrates one embodiment of a system of the present invention.

One embodiment of a system 20 of the invention is illustrated in FIG. 1. The system 20 includes a casino gaming system C. This system C may include a plurality of gaming devices, such as one or more gaming tables 22. The casino gaming system C may also include other types of gaming devices such as gaming machines (slot machines, video poker machines, etc.) at which one or more games, and preferably wager-based games which offer a player the opportunity for winnings, are presented. In the case of the gaming tables 22, a player may place wagers with one or more monetary value chips and may be paid winnings in the form of chips. Such players may desire to cash out those chips by turning them in for their monetary value (in currency/coins or equivalent funds to their financial account).

The casino gaming system C may include a wide variety of other features or elements. For example, the casino gaming system C may include one or more casino servers 24 (or similar computing devices). The casino servers 24 may comprise one or more processors or controllers, at least one communication device or interface, a database or other data storage device, and one or more additional memory or data storage devices (such as separate from the database). In one or more embodiments, the processor(s) is configured to execute one or more instructions, such as in the form of machine readable code (i.e. "software"), to allow the server 24 to perform various functionality, such as the functionality described herein. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the casino server 24 may include (or be linked communicatively at one or more times to) one or more input and/or output devices, such as a keyboard, mouse, touchscreen, video display or the like, whereby the processor may receive information from an operator or servicer of the server 24 and/or output information thereto. This allows, for example, an operator of the server 24 to interface with the server 24 to upgrade, maintain, monitor, etc., it. In other embodiments, an operator might interface with the server 24 via a separate workstation or other device.

In one embodiment, the processor and other elements of the server 24 may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the server 24 to communicate with the gaming tables 22 or other gaming devices, and preferably external devices, networks, systems and the like.

The casino server 24 may be configured to implement a variety of functionality (and/or there may be a plurality of different servers which each implement different functionality). In one embodiment, the server 24 may implement accounting functionality. The accounting functionality might include tracking of wagers made and winnings paid at the gaming machines 22 and, as described in more detail below, monetary transactions at a cashier cage 26, such as tracking the amounts of casino chips issued and redeemed, checks cashed, etc. In the case of a gaming system which includes the issuance of monetary value tickets or the like, the server 24 may also generate monetary value ticket data, validate tickets and the like.

The cashier cage 26 of the casino gaming system C may include a cashier workstation 34, a monetary value dispensing mechanism 36 and a chip reader 38. The workstation 34 may comprise, for example, a computing type device which comprises a processor, a memory, software stored in the memory for execution by the processor, one or more cashier input devices (such as a keyboard or keypad, mouse, etc.), a communication interface and at least one video display. The workstation 34 might further comprise or be coupled to other types of input devices, such as a scanner for reading an ID, player tracking card or the like, a camera for capturing one or more images of a person redeeming chips, etc.

The chip reader 38 preferably comprises a device which is configured to detect or read a number of chips for use in determining a value of those chips. In one embodiment, the chip reader is a device or system which is provided by an external vendor, wherein the system of the invention includes an interface for receiving the output of the chip reader in order to facilitate the cash-out of the chips via the system.

In one embodiment, for example, the chip reader 38 may comprise a mat 52 or other surface upon which chips 58 are deposited. The chip reader 38 further comprises one or more chip detectors. For example, when the chips 38 have RFID tags associated with them, the chip detector may comprise an RFID reader or detector 54A. However, in other instances, the chip detector may comprise a camera 54B or other image capture device. Other types of chip detectors may also be utilized (optical scanners, magnetic stripe readers, etc.), such as depending upon the configuration of the chip.

The chip reader 38 preferably also comprises a controller 56. The controller 56 may comprise a processor, a memory and machine-readable code stored in the memory and executable by the processor. Alternatively, the controller 56 may comprise a solid state device, such as a programmed chip or chips. The controller 56 may be configured to turn the camera 54B and/or RFID detector 54A on and off, to receive information from those devices, process the information from those devices and to generate and transmit an output. Such an output might comprise one or more of the following information: a number of chips detected or read, a total number of chips detected and number of chips read (such as when a different number of chips are detected than are successfully read), a value of each chip, a total value of the detected and/or read chips, chip denominations, and/or other information which may be obtained from the chips, such as the issuing entity, expiration, etc., as such information might be associated therewith, such as an RFID tag thereof). As described below, chip information which is output by the chip reader may be utilized by the workstation 34 and/or a cash system server 42 (as described below). For example, the chip reader might simply output information regarding the number of detected chips and their denomination and the workstation 34 and/or cash system server 42 might calculate a total value of the chips being redeemed from that information.

In one embodiment, the cashier workstation 34 is configured to communicate with the monetary value dispensing mechanism 36, either directly or indirectly (such as through a cash system server, as detailed below). This mechanism 36 preferably comprises a secure monetary value storage and dispensing mechanism. The mechanism 36 may be configured to securely store or house monetary value, such as paper currency and/or coins and, at one or more times, dispense monetary value to the cashier (in one embodiment, the device securely stores coins and/or currency in a manner where the coins/currency are not readily accessible, even to the cashier, wherein the coins/currency are dispensed from a secure area thereof to a point external thereto, such as via one or more dispensing mechanisms such as bill and/or coin transporters). One such device is sold under the name CageXchange by Everi Payments Inc. of Las Vegas, Nev., the configuration and details of which are incorporated herein by reference.

The system 20 may further comprise a monetary transaction processing system 40. This system 40 may be configured to aid in the processing of monetary transactions at the casino, and particularly the cashier cage 26. In one embodiment, the monetary transaction processing system 40 comprises one or more servers, such as a cash system server 42 and an AML system server 44. Each of those servers 42,44 may be similar to the casino server(s) 24 noted above (such as including a processor, memory, communication interface, etc.) but include software for implementing the functionality described herein. The monetary transaction processing system 40 might be operated by a vendor of the casino or might be part of the casino system itself.

As illustrated in FIG. 1, the system 20 may be configured to communicate with other systems and elements. For example, as illustrated, the cash system server 42 may communicate with external systems or devices, such as via the Internet 50 and/or other communication networks (wireless and/or wired, LANs, WANs, etc.). Such systems might comprise a banking system, such as for clearing or processing checks (such as for clearing a check presented by a casino customer by transferring funds from the customer's bank account to an account of the casino or performing a cash advance transaction based upon a presented bank debit or credit card). Similarly, the AML system server 44 might communicate with one or more external devices or systems. For example, the AML system server 44 might be configured to transmit or report designated financial transactions, such as to appropriate regulatory agencies.

In one embodiment, as illustrated in FIG. 1, the cash system server 42 is configured to control the monetary value dispensing mechanism 36 and/or receive information from it. Also, the cash system server 42 is configured to receive the output of the chip reader 38. In one embodiment, the cash system server 42 may include an interface which allows it to convert the output of the controller 56 into a format which can be used by the cash system server 42 (such an interface may be able to translate different type of inputs or information presented based upon different protocols, such as information received in different formats from controllers 56 of different vendors, into a recognizable format).

Figure 2:
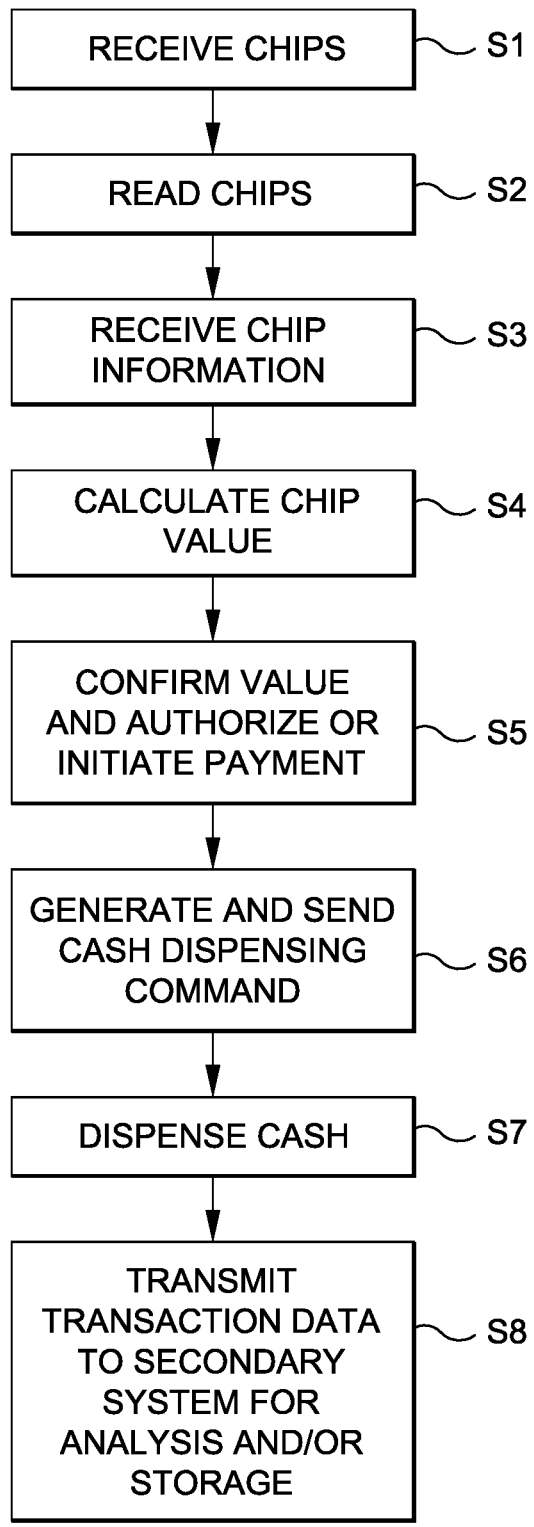
FIG. 2 is a flow chart which illustrates one embodiment of a process of the invention.

Additional aspects of the invention will be described with reference to FIG. 2, which is a flow diagram of one embodiment of a method or process in accordance with the invention.

In a step S1, a player may seek to redeem one or more casino chips by providing the chips to the cashier. In one embodiment, when the player seeks to initiate the cash-out, the cashier may start a transaction by providing input to the cashier workstation 34 to initiate the transaction. For example, as illustrated in FIG. 3, the workstation 34 may be configured to display a menu of transaction options, at least one of which comprises a "Chips Turn-In" option. The cashier may select this option, such as via a touchscreen or mouse of the workstation.

In one embodiment, the chip reader 38 may then be activated to read the chips, in a step S2. This may comprise the cashier placing the chips 58 on the mat 52 and the chip detector (camera or RFID detector) being activated to read the chips, such as by reading the RFID tags thereof or by capturing one or more images of the chips.

In another embodiment, it is possible for the transaction to be automatically started. For example, in one embodiment, the chip reader 38 may be programmed or controlled so that it is an "always on" state. In this configuration, the cashier may simply associate the chips 58 with the reader (such as by setting them on the mat 52), at which point the reader automatically detects the chips and begins the process (which then eliminates the need for the cashier to manually start the transaction, such as by providing the above-described inputs to the workstation 34).

In a step S3, information regarding the read or detected chips 58 is received from the detector(s). This information is used, at step S4, to calculate a value of the chips. It is noted that the controller 56 of the chip reader 38 could use the output from the detector(s) to determine the chip value, or the controller 56 might provide basic information regarding the chips (such as the number of each denomination of chip, such as "14 $1 chips and 22 $5 chips) to the workstation 34 or cash system server 42, which then determines the value In a preferred embodiment, the output of the detectors is provided to the controller 56 which then generates an output comprising information regarding the chips. Preferably this comprises information regarding the number of each denomination of chip that was read or detected.

Figure 5:
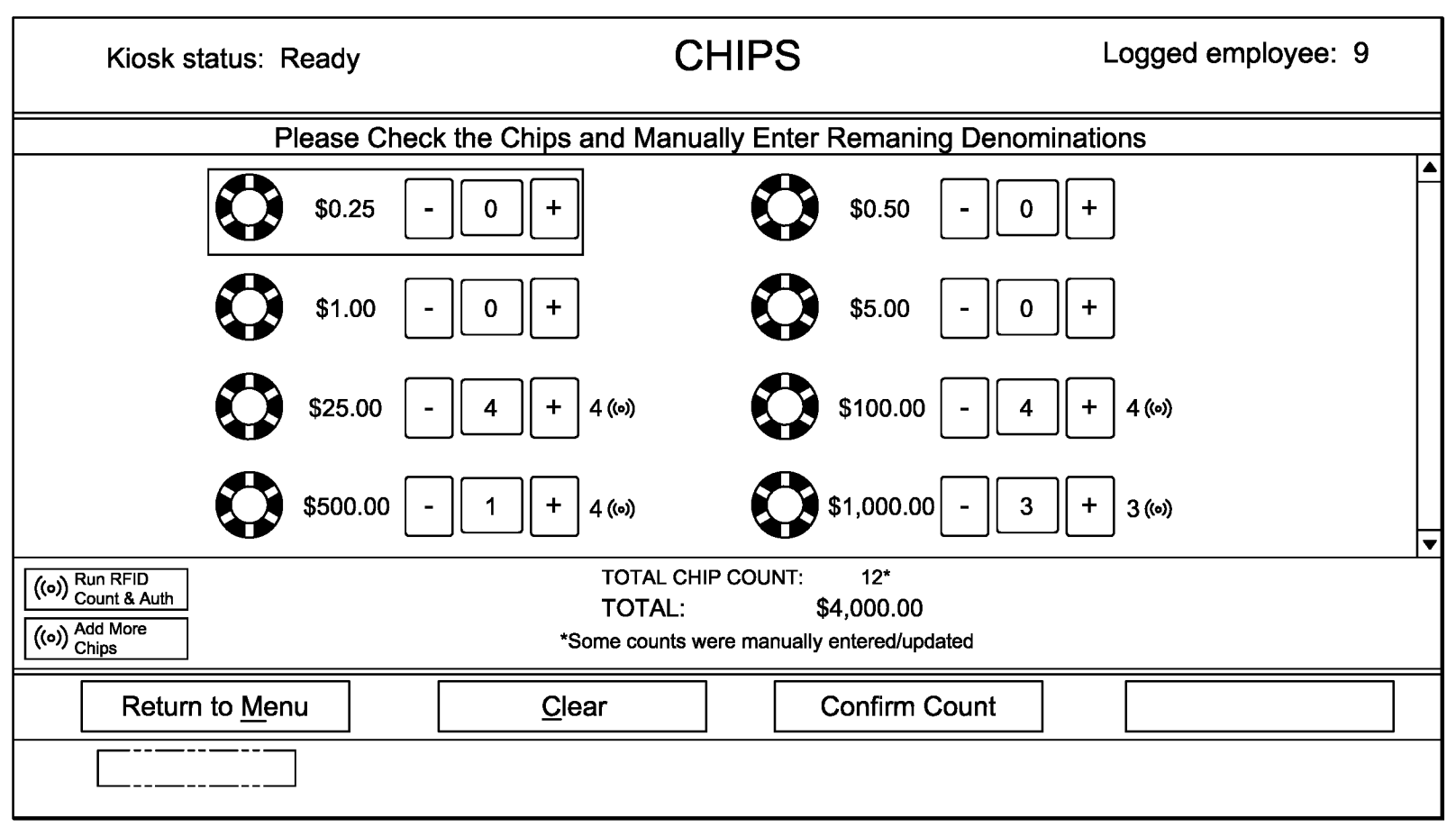

In a preferred embodiment, information is transmitted from the chip reader 38 to the cash system server 42 and the cash system server 42 then processes the information and transmits information to the workstation 34 for display to the cashier. For example, as illustrated in FIG. 4, once the cashier begins a chip turn-in, the workstation 34 may display an interface which shows the possible chip denominations and a zero count status. Then, as illustrated in FIG. 5, once the chips have been read, the cash system server 42 may cause the workstation interface to display a count of the chips of each denomination that were read, along with a total value.

In one embodiment, in a step S5, the cashier may be required to confirm the chip count and value in order to authorize the redemption. For example, as illustrated in FIG. 5, the cashier may be asked to check the chips manually to confirm the number of each denomination of chip, including whether the numbers of each chip denomination are correct and that no denominations are missing. As also illustrated in FIG. 5, the cashier may be permitted to manually update the numbers of each denomination of chip in an override (such as to increase or decrease the number of chips of each denomination).

Figure 6:
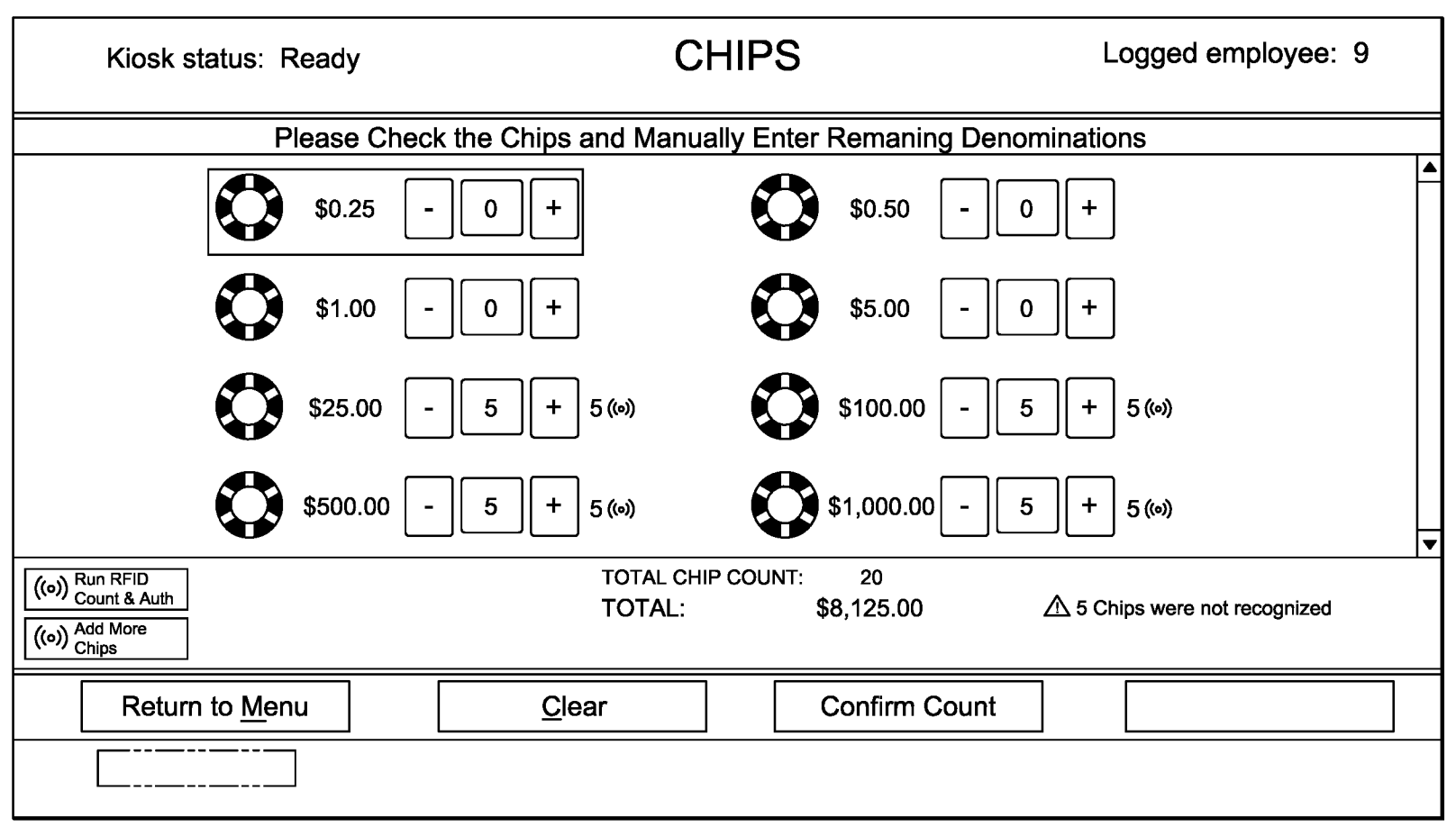
Figure 7:
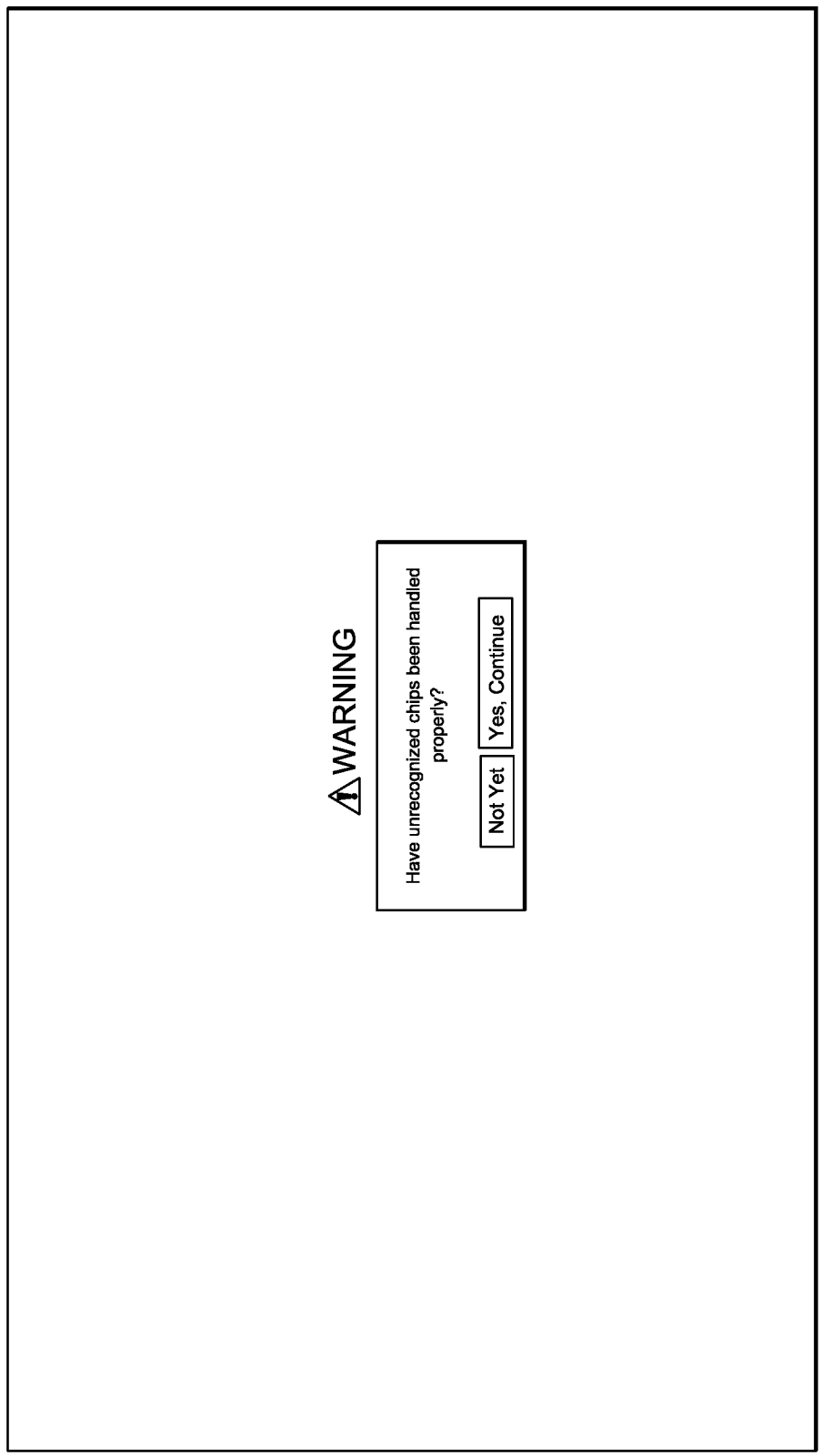

As illustrated in FIG. 6, in some instances, the controller 56 may not be able to recognize one or more chips. This information may be used to cause the workstation 34 to display a notice to the cashier that not all of the chips could be read or detected, thus requiring the cashier to ensure that those chips are accounted for manually. As further illustrated in FIG. 7, the cashier may be required to provide input to confirm that any unrecognized chips have been accounted for or that the chip count is otherwise confirmed.

Once the chip information has been finalized and processed by the cash system server 42, in a step S6 a cash dispensing command may be sent to the monetary value dispensing mechanism 36. As one example, once the cashier has confirmed the chip count and value via their workstation 34, that information may be transmitted to the cash system server 42. The server 42 may then send a command to the monetary value dispensing mechanism 36 to dispense currency in the amount of the value of the chips, as in step S7.

In a preferred embodiment, in a step S8, a transaction record is preferably created. This transaction record may be generated at the cash system server 42. The record might comprise one or more of: information regarding the player (in one embodiment, information may be obtained from the player as part of the transaction, such as personal information including their name and social security number, a scan of an ID, etc., which information might be obtained by the cashier and be manually input to the workstation 34 and then associated with the chip information and/or might be obtained in an automated or semi-automated fashion, such as by reading a player tracking card and retrieving player information from a player tracking database based upon the card, by reading or scanning an ID of the player, etc.); the number of each denomination of chip and the total value of the chips, including information regarding the output of the chip reader 38 and any modifications thereto by the cashier in reconciling the chip read with the provided chips; date/time of transaction; location of the transaction, and cashier ID, etc.

The transaction record, or one or more elements thereof, are preferably automatically transmitted to the AML system server 44. In one embodiment, the AML system server 44 is configured to store monetary transaction information, such as transaction records, and may be configured to analyze those transactions, such as for anti-money laundering compliance issues. For example, the AML system server 44 may be configured to analyze transactions, such as by reviewing transactions to determine if they meet a monetary value which requires reporting. In such an event, the AML system server 44 may be configured to generate one or more reports and to transmit such reports (such as via the Internet 50 to outside governmental agencies, etc.). The reports may include information which is stored in the transaction record, such as information regarding the customer associated with the transaction. The transaction record may also be used relative to AML incident investigations and the like.

Of course, the above-referenced steps may be performed in other orders or might include a greater or lesser number of steps. Further, the invention may have many variations. As one example, instead of utilizing a secure monetary value dispensing device 36, the cashier may dispense monetary value (such as currency or coins) from a cash drawer or the like. As another example, the transaction record may not be created after the transaction is complete but might be created and updated in stages. For example, the cashier workstation 34 may transmit information to the cash system server 42 when a transaction is initiated, at which point the cash system server 42 may create a transaction record by opening a new record. After the chips are scanned, that record may be updated with the chip information, and then later updated with any changes made by the cashier, etc.

FIG. 1 also illustrates an embodiment of a system 20 in which various components communicate with a cash system server 42. This embodiment allows multiple cashier cages to be integrated and operated centrally. However, in some embodiments, the cashier workstation 34 could communicate directly with the chip reader 38 and the monetary value dispensing mechanism 36 to trigger chip reading, determine chip values and cause cash to be dispensed. In this configuration, the workstation 34 might be configured to generate a transaction record and transmit that record directly to the AML server 44.

A particular advantage of the invention is that the system integrates a chip reader to aid in the chip redemption process. In one embodiment, the system includes a chip reader interface which allows chip reading devices from different vendors to be associated with the system, wherein the interface is configured to facilitate the use of outputs of those systems in different formats or protocols. For example, one chip reader might utilize an RFID detector which detects chips and their values by reading RFID tags, and then provides an output of a first protocol. Another chip reader might utilize a camera which obtains an image of one or more chips and analyzes the image, such as based upon the thickness of each chip, its, color, the height of the stack, etc., to determine the number of chips and their value, and then provide an output in a second protocol. Such a configuration may be utilized to determine, for example, that the RFID reader did not read information from one or more chips (for example, the RFID reader may report the reading of 6 chips, but the camera may detect that 7 chips are located on the mat; in such a configuration, the cashier may be notified as indicated above to manually verify the discrepancy).

Another advantage of the invention is that AML transaction reporting is automated and integrated into the casino cage chip cash-out process. In particular, each time a cash-out occurs, the results of the transaction and associated transaction information is reported to an AML system for storage, analysis, reporting and/or investigative purposes. This avoids having different systems perform those functions, having to manually move or enter information from one system to another, and increases the amount of information which is associated with the transaction in the AML system. Such information might be aggregate with information regarding other transactions performed by the player, such as cash-advance transactions, check cashing transactions and the like, for AML tracking, reporting and investigation purposes.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A casino monetary system comprising:
a cashier workstation comprising a processor, a memory, at least one user input device, a display, a communication interface and machine-readable code stored in said memory and executable by said processor;
a casino chip reader comprising a chip detector and a controller;
a cash dispenser;
a cash system server comprising a processor, a memory, a communication interface and machine-readable code stored in said memory thereof and executable by said processor thereof; and
an AML server comprising a processor, a memory, a communication interface and machine-readable code stored in said memory thereof and executable by said processor thereof;
said machine-readable code of said cash system server configured to cause said processor of said cash system server thereof to:
receive an output from said casino chip reader regarding a plurality of casino chips belonging to a player that are presented by an operator of the cashier workstation to said casino chip reader;
cause said display of said cashier workstation to display a graphical indication of chip denominations and a number of casino chips of each denomination that comprise the plurality of casino chips, and a total value of said plurality of casino chips;
cause said display of said cashier workstation to display a first graphically displayed button which increases the number of casino chips of a denomination and a second graphically displayed button which decreases the number of casino chips of a denomination;
receive, based upon secondary manual validation by said operator of said plurality of casino chips, a first input from the operator of the cashier workstation which confirms said number of casino chips of each denomination and said value, or at least one second input, by said operator and by input of the first graphically displayed button or the second graphically displayed button, which changes the number of casino chips of one or more of said denominations and which changes said value of said plurality of casino chips; and generate instructions to cause said cash dispenser to dispense an amount of cash equal to said value of said plurality of casino chips.

2. The casino monetary system in accordance with claim 1, wherein said machine-readable code of said cash system server is further configured to create a transaction record of said number of chips of each denomination and a value thereof, as confirmed by said operator or changed by said operator.

3. The casino monetary system in accordance with claim 1, wherein said machine-readable code of said cash system server is configured to cause said transaction record to be transmitted to said AML server.

4. The casino monetary system in accordance with claim 1, wherein said transaction record further comprises information regarding an identity of said player.

5. The casino monetary system in accordance with claim 1, wherein said casino chip reader comprises an RFID reader.

6. The casino monetary system in accordance with claim 1, wherein said casino chip reader comprises an image detector.

7. The casino monetary system in accordance with claim 1, wherein said casino chip reader comprises both an RFID reader and an image detector.

8. The casino monetary system in accordance with claim 1, wherein said graphical indication of chip denominations comprises an indication of all potential chip denominations and said number of casino chips of each denomination comprises 0 when no casino chips of a particular denomination exist in said plurality of casino chips.

9. The casino monetary system in accordance with claim 1, wherein said machine-readable code is further configured to display a warning when one or more of said plurality of casino chips are not readable by said casino chip reader.

10. A method of validating, redeeming and reporting casino chips presented for redemption comprising the step of:

providing a processor with machine-readable code configured to cause said processor to perform:

receiving a plurality number of casino chips from a player at a casino cashier station;

associating, by an operator of said casino cashier station, said plurality number of casino chips belonging to said player, with a casino chip reader comprising a chip detector and a controller;

reading information regarding said plurality number of casino chips using with said casino chip reader;

outputting information regarding said plurality number of casino chips read by said casino chip reader to a cash system server comprising a processor, a memory, and machine-readable code stored in said memory thereof and executable by said processor thereof;

causing a display of a cashier workstation to display a graphical indication of chip denominations and a number of casino chips of each denomination that comprise the plurality of casino chips and a total value of said plurality of casino chips;

causing said display of said cashier workstation to display a first graphically displayed button which increases the number of casino chips of a denomination and a second graphically displayed button which decreases the number of casino chips of a denomination;

receiving, at said cashier workstation, based upon secondary manual validation by said operator of said plurality of casino chips, a first input from the operator of the cashier workstation which confirms said number of casino chips of each denomination and said value, or at least one second input, by said operator and by input of the first graphically displayed button or the second graphically displayed button, which changes the number of casino chips of one or more of said denominations and which changes said value of said plurality of casino chip; and generating instructions to cause said cash dispenser to dispense an amount of cash equal to said value of said plurality of casino chips.

11. The method in accordance with claim 10, further comprising the step of creating a transaction record of said number of casino chips of each denomination and a value thereof, as confirmed by said operator or changed by said operator.

12. The method in accordance with claim 11, further comprising the step of transmitting said transaction record to an AML server.

13. The method in accordance with claim 11, wherein said transaction record further comprises information regarding an identity of said player.

14. The method in accordance with claim 10, wherein said casino chip reader comprises an RFID reader and said step of reading comprises reading RFID tags associated with said plurality of casino chips.

15. The method in accordance with claim 10, wherein said casino chip reader comprises an image capture device and said step of reading comprises capturing an image of said plurality number of chips.

16. The method in accordance with claim 10, wherein said graphical indication of chip denominations comprises an indication of all potential chip denominations and said number of casino chips of each denomination comprises 0 when no chips of a particular denomination exist in said plurality of casino chips.

17. The method in accordance with claim 10, further comprising causing said display of said cashier workstation to display a warning when one or more of said plurality of casino chips are not readable by said casino chip reader.

* * * * *